W. M. JANPOLE.
METHOD OF MAKING STRUCTURAL ELEMENTS.
APPLICATION FILED APR. 12, 1911.
1,024,687.
Patented Apr. 30, 1912.
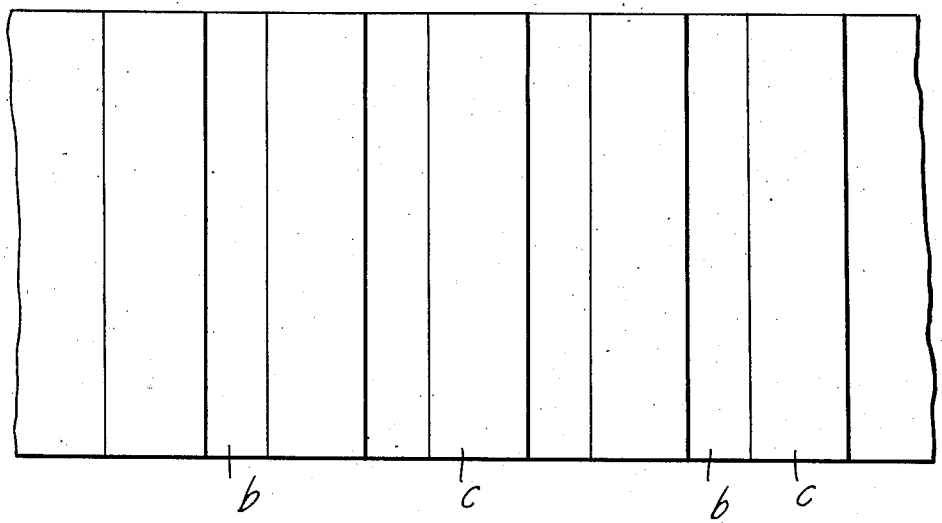
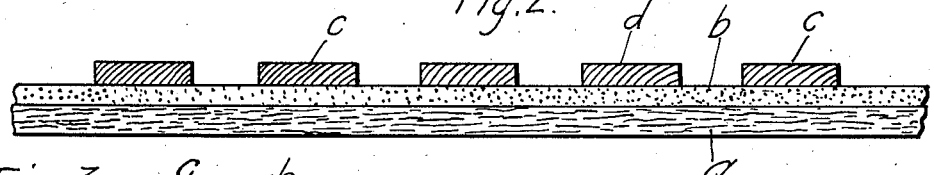
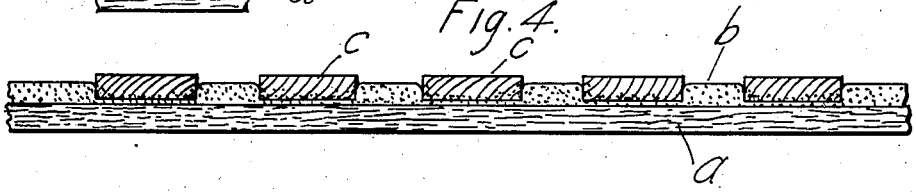
Witnesses

UNITED STATES PATENT OFFICE.

WILLIAM M. JANPOLE, OF LOS ANGELES, CALIFORNIA.

METHOD OF MAKING STRUCTURAL ELEMENTS.

1,024,687.  Specification of Letters Patent.  Patented Apr. 30, 1912.

Application filed April 12, 1911. Serial No. 620,690.

*To all whom it may concern:*

Be it known that I, WILLIAM M. JANPOLE, a citizen of the United States, residing at Los Angeles, in the county of Los Angeles and State of California, have invented an Improved Method of Making Structural Elements, of which the following is a specification.

This invention relates to the making of structural elements, such as wall or ceiling boards or sections, or the like; and it has for its object to provide an improved method of making such structural elements, which will be superior in point of relative simplicity and inexpensiveness of procedure, and superiority of product with respect to durability, facility of manipulation or installation in position of service, and general adaptability and utility for a wide range of uses.

In carrying the invention into practice, I employ a body of wood, paper or other suitable material to which is applied, in plastic form, a suitable material or mixture of materials, to which latter in turn are applied a plurality of strips, slats or lath or the like, the method of application being such as to cause a final positive adhesion of the lath or the like to the plastic material. When the plastic material has hardened, the body and the plastic material and the lath or the like are firmly adhesively united and constitute a structural element which may be worked up into suitable shapes and forms for subsequent use and service as elements of building wall construction, ceilings, and the like.

In practising the invention I may preferably employ a composition of matter for application in plastic form to the body, which is organized according to an invention evidenced by my application for Letters Patent executed this day prior to filing the same in the United States Patent Office, and the ingredients of which are asphaltum, carbonate of lime, and infusorial earth or colloidal clay. These are mixed hot, and the resultant composition is stiff and hard though pliable, and is devoid of objectionable stickiness or adhesive quality. But I do not desire to be understood as limiting myself to the employment of this particular composition, or of any other composition, in the practising of the present invention.

The body of paper, wood or the like, is coated with suitable heated material in plastic form. The slats or lath or the like are then heated and afterward brought into contact with the still warm and soft plastic material. The heated lath or the like gradually absorb the plastic material into the voids or cells thereof, and gradually sink into the plastic material. Finally, the lath are subjected to sufficient pressure to sink them into the still warm plastic coating, almost into contact with the paper or other body. The plastic material is then allowed to cool and harden, and the resultant structural element may then be worked up into the required shape and form and applied in position of service, as part of a wall or other structure, according to the nature of use concerned. When the composition which is applied in plastic form to the body is that specifically above mentioned, the entire product is subjected while warm to a dusting of the infusorial earth, preferably that known as sil-o-cel, until the plastic surface is sufficiently covered in accordance with the conditions and purposes to be met with. The structural element so organized and produced is of long life and great durability, is convenient to handle and apply, and relatively inexpensive in formation. It may be covered or given such surface finish as may be desired, and constitutes an effective fire-proof, sanitary, sound-proof, heat insulating, air-tight and water-tight element of that structure in which it is incorporated or included.

In the drawing: I have illustrated in Figure 1 a structural element such as formed in practising the present invention. In Fig. 2 I have shown a side edge view of the same at the time that the lath or the like are first applied to the hot plastic coating of the body. In Fig. 3 I have shown the lath or the like as partly entering the plastic material, due to gravity and absorption; and, in Fig. 4 I have shown the lath or the like as pressed into final position and but slightly spaced from the coated body.

In all the figures, *a* designates the body of paper or paper-board or the like, *b* designates the material applied in plastic form to the body, and *c* designates the lath or the like applied to and finally firmly adhesively connected with the plastic material *b*.

Having thus described my invention, I claim and desire to secure by Letters Patent:—

1. A method of making structural elements consisting of first providing a body, next coating the body with a hot plastic material, next applying previously heated strips of wood or the like to the hot plastic material and permitting absorption of the latter by the former under gravity of the former, and finally pressing the strips into final position in the plastic coating.

2. A method of making structural elements consisting of first providing a body, next coating the same with a hot plastic composition of asphaltum and carbonate of lime and infusorial earth or the like, next applying previously heated strips of wood or the like to the hot plastic coating and permitting absorption of the latter by the former under gravity of the former, then pressing the strips of wood or the like into final position in the plastic coating, and finally dusting the still warm coating with pulverulent infusorial earth.

In testimony whereof, I have signed my name to this specification in the presence of two subscribing witnesses.

WILLIAM M. JANPOLE.

Witnesses:
HARRY R. HOLLGER,
RAYMOND W. JANPOLE.